(12) United States Patent
Gerard

(10) Patent No.: US 7,426,749 B2
(45) Date of Patent: Sep. 16, 2008

(54) DISTRIBUTED COMPUTATION IN UNTRUSTED COMPUTING ENVIRONMENTS USING DISTRACTIVE COMPUTATIONAL UNITS

(75) Inventor: Scott N. Gerard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/760,592

(22) Filed: Jan. 20, 2004

(65) Prior Publication Data

US 2005/0160288 A1 Jul. 21, 2005

(51) Int. Cl.
*H04L 9/00* (2006.01)

(52) U.S. Cl. .......................... 726/22; 726/26; 713/180; 713/189; 713/194

(58) Field of Classification Search ................. 713/180, 713/189, 194; 726/22, 26
See application file for complete search history.

(56) References Cited

U.S. PATENT DOCUMENTS

| 5,892,899 | A | 4/1999 | Aucsmith et al. | |
|---|---|---|---|---|
| 6,950,937 | B2 * | 9/2005 | Jakobsson et al. | ........... 713/180 |
| 2002/0174227 | A1 | 11/2002 | Hartsell et al. | |
| 2003/0023859 | A1 | 1/2003 | Kiddy | |
| 2003/0046547 | A1 | 3/2003 | Jakobsson et al. | |
| 2004/0039928 | A1 * | 2/2004 | Elbe et al. | ................... 713/189 |

FOREIGN PATENT DOCUMENTS

| JP | 2001325041 | | 11/2001 | |
|---|---|---|---|---|
| JP | 2002175008 | | 6/2002 | |
| JP | 2004004341 | | 1/2004 | |
| WO | WO 0248857 | A2 * | 6/2002 | ................. 713/189 |
| WO | WO 02/095546 | A3 | 11/2002 | |

OTHER PUBLICATIONS

Albert D. Alexandrov et al., "SuperWeb: Research Issues in Java-Based Global Computing," Department of Computer Science, University of California, Santa Barbara, CA, 1996.
Viktors Berstis, "Fundamentals of Grid Computing," Redbooks Paper, ibm.com/redbooks, 2002.
Ian Foster et al., "The Anatomy of the Grid, Enabling Scalable Virtual Organizations," Int'l J. Supercomputer Applications, 2001.
Luis F. G. Sarmenta, "Bayanihan: Web-Based Volunteer Computing Using Java," Mar. 4, 1998; Lecture Notes in Computer Science; http://www.cag.lcs.mit.edu/bayanihan/papers/wwca98/html/.

* cited by examiner

*Primary Examiner*—Kambiz Zand
*Assistant Examiner*—Yonas Bayou
(74) *Attorney, Agent, or Firm*—Wood, Herron & Evans, LLP

(57) ABSTRACT

An apparatus, program product and method initiate the execution of distractive computational units along with the execution of other computational units on an untrusted computer to inhibit the reconstitution of a computation by an untrusted party. In particular, along with partitioning a particular computation into a plurality of computational units, one or more distractive computational units are generated and supplied to one or more resource providers for execution along with those of the partitioned computation.

11 Claims, 2 Drawing Sheets

DISTRIBUTED COMPUTATION IN UNTRUSTED COMPUTING ENVIRONMENTS USING DISTRACTIVE COMPUTATIONAL UNITS

FIELD OF THE INVENTION

The invention relates to computers and computer software, and in particular, to protecting computations performed in an untrusted distributed computing environment.

BACKGROUND OF THE INVENTION

The computer industry is increasingly beginning to rely on the utility model of computation. In contrast with the traditional computing paradigm, where organizations typically purchase and maintain all of the necessary hardware and software computer resources required to meet their own individual computing needs, the utility model of computation views computer resources more in terms of a utility or service that may be effectively shared by multiple organizations to meet the collective computing needs of all of those organizations.

One such computational utility environment is referred to as grid computing, where a collection of potentially heterogeneous and geographically remote computer systems are connected together in a distributed fashion to share their respective resources and present the appearance of a single large and powerful virtual computer system. A grid computing environment may be used to share various hardware and software resources such as processors, applications, storage, memory, printers, network connections, and other peripheral devices. In a computational grid, the hardware and/or software resources of multiple computers are abstracted, with specialized software used to pass work to various resources in such a manner as to maximize the utilization of the underlying resources.

Grid computing is often more effective in terms of system utilization efficiency than traditional computing environments given that many computers are often significantly underutilized much of the time. Organizations that use traditional computing environments are typically required to maintain sufficient computing power to meet those organization's maximum or peak demands on each of their computing systems, regardless of how frequently those peak demands occur. With grid computing, on the other hand, the computing power of multiple organizations (or even the computing power of multiple sites or systems owned by the same organization) may effectively be shared so that work can be distributed to different resources in the grid for maximum overall system utilization. In many instances, the collective computing power maintained in a grid may be less than that which would otherwise be required to satisfy the individual computing demands of each consumer for the grid.

In many instances, grid computing also provides the possibility for highly parallel processing, which is desirable for many complex computing applications. Moreover, grid computing often provides failover, load balancing and other high availability capabilities to increase the reliability and availability of a grid, as well as other high level capabilities such as security, administration, etc.

While some computational utility environments may be maintained within a single organization, in many instances computational utility environments are used by multiple organizations, or may even be publically maintained and/or supported. Grid and web services, for example, may be utilized to abstract computational resources from multiple organizations and enable clients or consumers of a grid (even those that do not host any of the computing resources in the grid) to have computations or other tasks performed on their behalf by one or more resource providers. Furthermore, cost structures may be developed to enable clients of a grid to pay for the use of resources on a per-transaction or subscription basis.

As an example, grid computing may be used to perform many of the types of computations that are traditionally performed on multi-million dollar supercomputers. Through the interconnection of hundreds or thousands of significantly less expensive and lower performance computers in a grid, and then partitioning complex computations into computational units that are processed in parallel by multiple computers, a grid may provide performance that is on par with that of many supercomputers, but at a significantly reduced cost. Many organizations are more than willing to pay for the use of a grid, either on a transaction or a subscription basis, to avoid the need to purchase and maintain sufficient in-house computing power to handle complex computations.

One drawback to grid computing and other forms of distributed and computational utility environments, however, are the security issues that are raised by virtue of the multi-organizational structure of a grid.

In many distributed and computational utility environments, for example, it is anticipated that numerous organizations will provide computing resources to the infrastructure for the environment. In some instances, these organizations may even be competitors of one another. A client wishing to have work performed in such an environment may therefore not have complete control over the confidentiality of its data.

While encrypted communications may be used to protect communications between computers, when the underlying processing of data is performed on a particular computer in a computational utility environment, that computer typically must be capable of decrypting the data prior to performing the computation. Put another way, encryption usually protects data during transmission between the client and a resource, but not once the data is received and processed by that resource.

As a result, it is possible that computations performed on behalf of a client in a computational utility environment may be performed, at least in part, by computing resources hosted by competitors or other untrusted parties. A substantial risk therefore exists that a curious or malicious untrusted party will eavesdrop on computations and/or communications associated with computations while hosting computing resources, thereby creating a risk that a client's confidential data may be compromised.

Therefore, a significant need exists in the art for protecting computations performed in a computational utility or other untrusted distributed computing environment.

SUMMARY OF THE INVENTION

The invention addresses these and other problems associated with the prior art by providing an apparatus, program product and method that initiate the execution of distractive computational units along with the execution of other computational units on an untrusted computer to inhibit the reconstitution of a computation by an untrusted party. In particular, along with partitioning a particular computation into a plurality of computational units, one or more distractive computational units are generated and supplied to one or more resource providers for execution along with those of the partitioned computation. It is believed that the presence of a distractive computational unit, along with one or more computational units that are generated as a result of partitioning a computation of interest, can significantly complicate detection and reconstitution of the computation or its overall result from the computational units supplied to an untrusted computer.

Various embodiments consistent with the invention may implement a distractive computational unit in a number of different manners. For example, a distractive computational unit may be implemented as a dummy computational unit that is otherwise not used to generate result data. As another example, a distractive computational unit may be implemented as a computational unit from another partitioned computation. When combined additionally with the optional execution of other computational units from a given partitioning on multiple, distinct computers, the ability of an untrusted party to reconstitute a computation is significantly reduced. However, it will be appreciated that the specific examples discussed above are merely illustrative in nature, and the invention is not limited to these particular examples.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize distractive computational units to inhibit reconstitution of a partitioned computation executed at least in part by an untrusted computer. The untrusted computer may be coupled to, for example, a computational utility environment such as a computational grid, whereby grid services, web services, and other distributed computing functionality is utilized permit computational resources to be used to perform computations on behalf of a client. In this regard, a computer is untrusted to the extent that a client or owner of a computation cannot be assured that a party having access to the untrusted computer or communications to or from such a computer will not be able to "eavesdrop" or otherwise monitor confidential computations and/or data traffic.

Consistent with the invention, a computation is partitioned or divided into multiple computational units, which are then distributed to one or more computation providers in such a way that any untrusted computation provider is unable to effectively recombine the computational units to reconstitute the original computation. The results are then recombined to produce a final result, typically in an environment that is secure from eavesdropping by unauthorized parties.

To inhibit reconstitution or recombination of a computation, distractive computational units are distributed to untrusted computers along with computational units from a partitioned computation. A distractive computational unit, in this context, is a computational unit that distracts or otherwise complicates the ability of an untrusted computer to determine which computational units from among those passed to an untrusted computer belong to the same partitioned computation. For example, a distractive computational unit may be implemented as a dummy computational unit that is otherwise not used to generate result data, but which appears to an untrusted computer to be a member of a computation. As another example, a distractive computational unit may be implemented as a computational unit from another partitioned computation, which may even be a duplicate of the same computation, such that units from multiple computations are passed to an untrusted computer in such a manner that the membership of those computational units is difficult or impossible to ascertain. It will also be appreciated that additional protection may be provided by distributing some of the computational units to other computers that are under the control of other parties who are unrelated to, and not in communication with, a particular untrusted party. Other implementations of a distractive computational unit will be apparent to one of ordinary skill in the art having the benefit of the instant disclosure.

Figure 1:
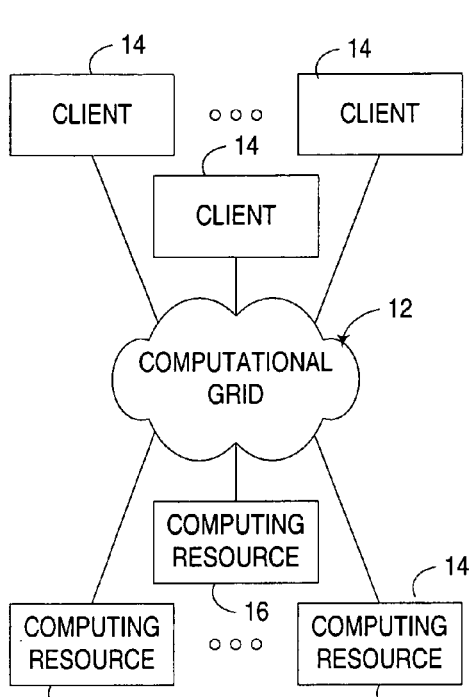
FIG. 1 is a block diagram of a computational utility environment suitable for implementing distractive distributed computing consistent with the invention.

Now turning to the Drawings, wherein like numbers denote like parts throughout the several views, FIG. 1 illustrates an exemplary computational utility environment 10 consistent with the invention. Environment 10, for example, is implemented using a computational grid 12, which is used to couple a plurality of clients 14 to a plurality of computing resources 16.

Computational grid 12 may be implemented using any number of computers, peripherals, storage devices, network connections and other software and components suitable for providing shared access to resources 16, as is well known in the art. It will be appreciated that the components of grid 12, clients 14 and resources 16 may be located at any number of sites and may be under the control or domain of any number of organizations or individuals. Moreover, such components may be homogenous or heterogenous in nature.

Figure 2:
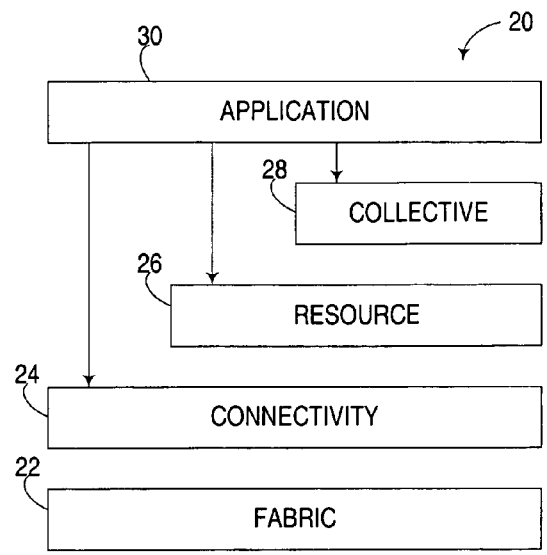
FIG. 2 is a block diagram of software layers in an exemplary implementation of the computational utility environment of FIG. 1.

FIG. 2 next illustrates an exemplary and highly abstract architecture 20 for computational utility environment 10. For example, architecture 20 includes a fabric layer 22 that is used to provide logical representations of the resources to which shared access is mediated by grid protocols. In the illustrated embodiment fabric components predominantly implement local, resource-specific operations Architecture 20 also includes a connectivity layer 24 that defines the predominant communication and authentication protocols for grid transactions, and in particular, between fabric layer components. The communication protocols may include various communications-related services such as transport, routing and naming. The authentication protocols may be used, for example, to provide secure mechanisms for verifying the identities of users and resources.

Architecture 20 also includes a resource layer 26 that provides protocols for shared access to resources, e.g., via support for secure negotiation, initiation, monitoring, control, accounting, and payment of sharing operations on individual resources. In addition, a collective layer 28 is used to coordinate access to collections of resources, including, for example, directory services, co-allocation, scheduling and brokering services, monitoring and diagnostics services, data replication services, programming systems, workload management systems and collaboration frameworks, software discovery services, community authorization services, community accounting and payment services, and collaboratory services, among others. Layers 24, 26 and 28 are typically accessible by a grid-enabled application 30.

It will be appreciated that different services may be implemented in each layer of architecture 20. Furthermore, architecture 20 is merely exemplary in nature, and other grid or computational utility architectures may be used in the alternative. The invention is therefore not limited to the particular computational utility environment illustrated herein.

Figure 3:
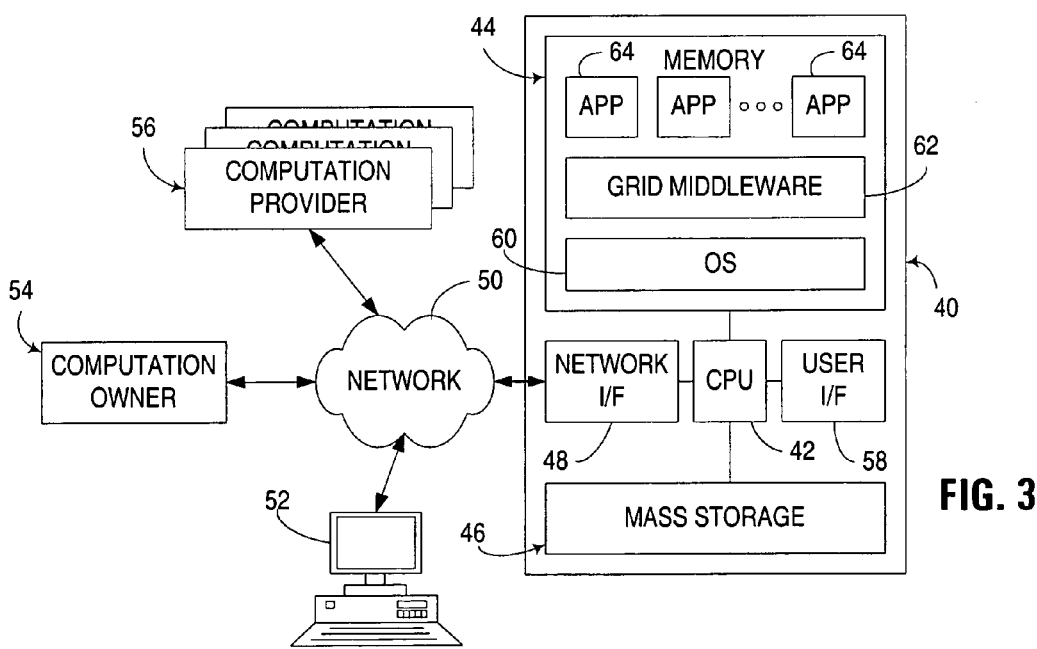
FIG. 3 is a block diagram of an exemplary hardware and software implementation of the computational utility environment of FIG. 1.

FIG. 3 next illustrates an exemplary hardware and software environment for an apparatus 40 suitable for performing distractive distributed computation consistent with the invention. In particular, apparatus 40 is implemented as a broker computer resident in computational utility environment 10 of FIG. 1. For the purposes of the invention, however, apparatus 40 may represent practically any type of computer, computer system or other programmable electronic device, including a client computer, a server computer, a portable computer, a handheld computer, an embedded controller, etc. Moreover, apparatus 40 may be implemented using multiple networked computers, e.g., in a cluster, a computational grid, or other distributed computing system. Apparatus 40 will hereinafter also be referred to as a "computer," although it should be appreciated that the term "apparatus" may also include other suitable programmable electronic devices consistent with the invention.

Computer 40 typically includes a central processing unit (CPU) 42 including one or more processors coupled to a memory 44, which may represent the random access memory (RAM) devices comprising the main storage of computer 40, as well as any supplemental levels of memory, e.g., cache memories, non-volatile or backup memories (e.g., programmable or flash memories), read-only memories, etc. In addition, memory 44 may be considered to include memory storage physically located elsewhere in computer 40, e.g., any cache memory in a processor in CPU 42, as well as any storage capacity used as a virtual memory, e.g., as stored on a mass storage device or on another computer coupled to computer 40.

For non-volatile storage, computer 40 typically includes one or more mass storage devices 46, e.g., a floppy or other removable disk drive, a hard disk drive, a direct access storage device (DASD), an optical drive (e.g., a CD drive, a DVD drive, etc.), and/or a tape drive, among others. Furthermore, computer 40 may also include an interface 48 with one or more networks 50 (e.g., a LAN, a WAN, a wireless network, and/or the Internet, among others) to permit the communication of information with other computers and electronic devices, e.g., one or more client or administration computers 52, one or more computation owners 54, and one or more computation providers 56. In other implementations, a computational grid may be resident solely within computer 40, whereby a computation owner and a computation provider may communicate with the grid via user interface 58.

Computer 40 also typically receives a number of inputs and outputs for communicating information externally. For interface with a user or operator, computer 40 typically includes a user interface 58 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client computer 52 coupled to computer 40 via network 50 and network interface 48. It should be appreciated that computer 40 typically includes suitable analog and/or digital interfaces between CPU 42 and each of components 44, 46, 48 and 58 as is well known in the art.

Computer 40 operates under the control of an operating system 60, and executes or otherwise relies upon various computer software applications, components, programs, objects, modules, data structures, etc. For example, a grid middleware component 62 may be resident to implement a portion of the aforementioned computational grid 12, and which is accessible to one or more grid-enabled applications 64 further resident on computer 40. Moreover, additional applications, components, programs, objects, modules, etc. may also execute on one or more processors in another computer coupled to computer 40 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

It will also be appreciated that the various embodiments of the invention are also capable of being implemented as a service that is implemented on one or more computers, and that is made available to clients having access to the service. Such a service may be provided, for example, via a computational utility, a grid service, a web service, etc.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention. Moreover, those skilled in the art will appreciate that the invention may be utilized in other environments where a computation is performed on one or more untrusted computers, whether implemented as a computational utility environment, a grid environment, a distributed computing environment, a client-server environment, a peer-to-peer environment, or other multi-computer environment known in the art.

Figure 4:
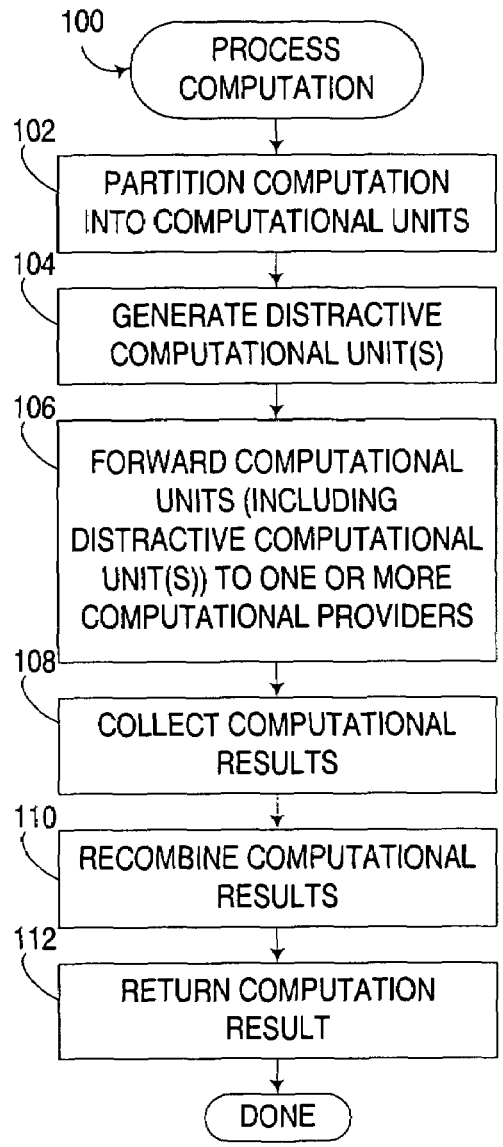
FIG. 4 is a flowchart illustrating an exemplary process computation routine executed by the broker computer referenced in FIG. 3, and implementing distractive distributed computing consistent with the invention.

Now turning to FIG. 4, an exemplary process computation routine 100, executed for example by one or more broker computers in computational grid 12 in response to a client or owner request, is illustrated in greater detail. Typically, the client or owner request specifies a particular computation, which routine 100 begins processing in block 102 by partitioning the computation into a plurality of computational units.

While other manners of partitioning a computation may be used in other embodiments, one manner of partitioning that may be used in block 102 utilizes the Chinese Remainder Theorem (CRT) on the arguments of a computation. Under the CRT, and with two integers J and K as computation arguments that are less than a maximum size M, one may choose moduli m1, m2 and m3 (where m1, m2 and m3 are relatively prime in pairs, and m1*m2*m3=M), such that:

| | |
|---|---|
| j1 = J (mod m1) | k1 = K (mod m1) |
| j2 = J (mod m2) | k2 = K (mod m2) |
| j3 = J (mod m3) | k3 = K (mod m3) |

By the CRT:

| | |
|---|---|
| j1 + k1 = J + K (mod m1) | j1 * k1 = J * K (mod m1) |
| j2 + k2 = J + K (mod m2) | j2 * k2 = J * K (mod m2) |
| j3 + k3 = J + K (mod m3) | j3 * k3 = J * K (mod m3) |

Subtraction and division can also be performed in a like manner. Furthermore, j1, j2, and j3 can be recombined to find J, and k1, k2, and k3 can be recombined to find K.

As such, given a value M which is larger than the maximum size of any integer in a computation, one can divide a computation involving integers into multiple computational units by choosing m1, m2 and m3, and performing modulo operations on the arguments of the computation to generate three, separate computational units, each using a different mi.

In the illustrated embodiment, the sizes of the mi typically should be roughly the cube root of M. It will also be appreciated that a computation can be divided into N computational units by choosing mi's that are roughly the N-th root of M (and relatively prime). Additionally, it may be desirable in some embodiments to select only prime numbers for each mi.

As such, once a computation is partitioned in block 102, control passes to block 104 to generate at least one distractive computational unit, then control passes to block 106 to forward the computational units (including the distractive computational unit(s)) to one or more computational providers to effectively initiate execution of those computational units on the computational providers' computing resources. Block 108 then collects the computational results generated by the computational providers, and block 110 recombines the results using the CRT to generate an overall result. Block 112 then returns the computational result to the client, and routine 100 is complete.

In other embodiments, the various steps outlined in FIG. 4 may be performed by different entities. For example, in some embodiments a client or owner may perform the partitioning of computations into computational units and/or the recombining of results, with a trusted broker computer or other entity in a computational grid used merely to pass computational units to and results from computational providers. In still other embodiments, a client or owner may perform all of the steps outlined in FIG. 4. Other alternatives will be apparent to one of ordinary skill in the art having the benefit of the instant disclosure.

Various implementations of partitioning a computation into computational units and generating a distractive computational unit to inhibit reconstitution of a computation by an untrusted party may be envisioned. For example, as noted above, a distractive computational unit may be implemented as a dummy computational unit that has the appearance of any other computational unit, but which the result thereof is never used once returned. Such dummy computational units may be randomly generated, or generated in other programmatic manners. In some implementations where costs are incurred on a per-computation basis, the use of dummy computational units may increase a computation owner's cost; however, the presence of such units may significantly increase the number of possible recombinations that a malicious party would need to consider.

As another example, the computational units for a large number (F) of full computations may be submitted together at roughly the same time, with no identifiers in the individual computational units that indicate a particular association between a computational unit and a full computation, e.g., by giving each computational unit a unique and uncorrelated ID that is known only to the party that partitions the computation and combines the result. In addition, it may be desirable to interleave the computational units passed to each untrusted computer so that the order of the computational units is not indicative of their association with any particular computation. In this regard, the computational units for each computation serve as distractive computational units for the other computations submitted therewith.

With the CRT, for example, combining the computational units <F1, m1>, <F2, m2>, and <F3, m3> would give a seemingly valid result even though the result would actually be nonsense, since the units come from three completely separate full computations (F1, F2, and F3).

As another example, it may be desirable to select different manners or algorithms to partition individual computations, e.g., by selecting different mi's for different computations when using the CRT to partition computations. In some implementations, for example, it may be possible for an untrusted party to determine which mi is used for each computational unit by eavesdropping on the computation. By doing so, an untrusted party may be able to sort multiple computational units into buckets that have the same mi. Under the CRT, a computational unit from one bucket cannot be recombined with a computational unit from the same bucket since the mi's in the CRT must be relatively prime. As such, were F computations partitioned into three computational units each using the same mi's, an untrusted party could sort the computational units into three buckets, and then analyze the $F^3$ ways those units could be recombined. In general, if F computations are each partitioned into P computational units, there will be $F^P$ possible ways to recombine those computational units.

To address this potential form of attack, different sets of mi may be selected for each full computation, e.g., by selecting mi's from a superset of suitable mi's. For example, it may be sufficient in many implementations to divide each computation into three units. However, rather than selecting three mi's, greater security would be provided by choosing more than three mi's, e.g., 10 mi's, which are all roughly the cube-root of M. In many instances, it is irrelevant whether the product of any three mi's selected for a computation is exactly M, so long as the product of the three selected mi's meets the aforementioned constraint on M in the CRT. Consequently, for each computation, three different mi's out of the 10 available may be used to partition the computation. In such an implementation, the number of possible valid combinations that an untrusted party would need to consider for F computations would be much larger, i.e., $(_3{}^{10})F^3$, as in general, if P computational units are used for each of F computations, and P moduli are selected from a superset of TP moduli to generate the P computational units, there will be $(_P{}^{TP})F^P$ ways to recombine the resulting computational units.

As yet another example, a given computation may be partitioned in multiple manners, with computation units generated for the multiple partitions submitted collectively, whereby the computational units from one partition serve as distractive computational units for the computational units from each other partition.

Figure 5:
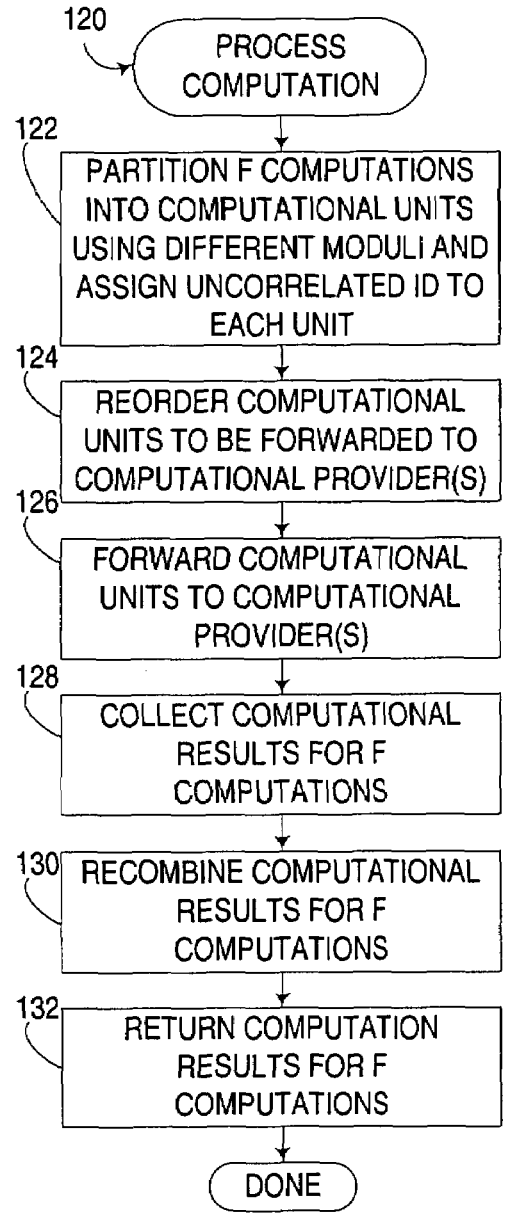
FIG. 5 is a flowchart illustrating another exemplary process computation routine executed by the broker computer referenced in FIG. 3, and implementing distractive distributed computing consistent with the invention.

One specific implementation of distractive distributed computing consistent with the invention, and utilizing a number of the distractive techniques discussed above, is illustrated in greater detail by a process computation routine 120 shown in FIG. 5. Routine 120 begins in block 122 by partitioning F computations into computational units in the CRT using different moduli taken from a superset of moduli. In addition, block 122 assigns uncorrelated identifiers for each computational unit to inhibit derivation of an association between computational units and specific computations.

Next, block 124 reorders the computational units to be forwarded to one or more computational providers, thereby interleaving computational units from different computations together.

Next, block 126 forwards the computational units from the multiple computations to the one or more computational providers to effectively initiate execution of those computational units on the computational providers' computing resources. Block 128 then collects the computational results generated by the computational providers, and block 130 recombines the results using the CRT to generate an overall result. Block 132 then returns the computational result to the client, and routine 120 is complete.

Various additional modifications may be made to the herein-described embodiments without departing from the spirit and scope of the invention. Therefore, the invention lies in the claims hereinafter appended.

What is claimed is:

1. A method of initiating performance of a computation on at least one untrusted computer, the method comprising:
partitioning the computation into a plurality of computational units that are combinable to generate a result for the computation, wherein the computation includes a plurality of arguments, wherein partitioning the computation into the plurality of computational units comprises partitioning using the Chinese Remainder Theorem (CRT), wherein partitioning the computation into the plurality of computational units comprises selecting a plurality of relatively prime moduli and generating each computational unit by performing a modulo operation on each of the plurality of arguments using one of the plurality of relatively prime moduli, and wherein selecting the plurality of relatively prime moduli includes selecting each modulus from a superset of relatively prime moduli;
partitioning a plurality of computations into multiple computational units using different sets of moduli selected from the superset of relatively prime moduli:
generating at least one distractive computational unit, wherein the distractive computational unit comprises a dummy computational unit;
initiating execution of both the at least one distractive computational unit and computational units from multiple computations on the untrusted computer to inhibit reconstitution of the computations by an untrusted party;
receiving result data generated during execution of the computational units from the multiple computations; and
generating results for the multiple computations from the result data.

2. The method of claim 1, wherein the distractive computational unit comprises a computational unit generated from partitioning a second computation.

3. The method of claim 2, wherein initiating execution of both the at least one distractive computational unit and at least one of the plurality of computational units includes interleaving the at least one distractive computational unit among multiple computational units from the plurality of computational units.

4. The method of claim 2, wherein partitioning the computation uses a different algorithm than that used to partition the second computation.

5. The method of claim 1, wherein the distractive computational unit comprises a computational unit generated from a second partitioning of the computation.

6. The method of claim 1, further comprising initiating execution of at least one of the plurality of computational units on a second computer.

7. The method of claim 1, further comprising initiating execution of all of the plurality of computational units on the untrusted computer.

8. The method of claim 1, wherein the untrusted computer is coupled to a grid computing network.

9. The method of claim 8, wherein partitioning the computation is performed by a client computer coupled to the grid computing network.

10. The method of claim 8, wherein partitioning the computation is performed by a broker computer coupled to the grid computing network, the method further comprising receiving the computation from a client computer.

11. The method of claim 1, wherein partitioning the computation, generating the distractive computational unit, and initiating execution of both the distractive computational unit and the one of the plurality of computational units on the untrusted computer are performed by at least one computer coupled to the untrusted computer, the method further comprising communicating the distractive computational unit and the one of the plurality of computational units to the untrusted computer.

\* \* \* \* \*